United States Patent
Mildner et al.

(10) Patent No.: US 9,321,486 B2
(45) Date of Patent: Apr. 26, 2016

(54) UNDERSTRUCTURE FOR A MOTOR VEHICLE

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/505,325

(22) Filed: Oct. 2, 2014

(65) Prior Publication Data

US 2015/0091333 A1 Apr. 2, 2015

(30) Foreign Application Priority Data

Oct. 2, 2013 (DE) .......................... 10 2013 016 456

(51) Int. Cl.
*B62D 21/02* (2006.01)
*B62D 27/02* (2006.01)

(52) U.S. Cl.
CPC .............. *B62D 21/02* (2013.01); *B62D 27/023* (2013.01)

(58) Field of Classification Search
CPC ...... B62D 21/03; B62D 21/02; B62D 27/023; B62D 25/2027
USPC ............ 296/193.08, 203.04, 205, 29, 193.07; 280/795, 796
See application file for complete search history.

(56) References Cited

U.S. PATENT DOCUMENTS

| | | | |
|---|---|---|---|
| 4,355,844 A | 10/1982 | Muzzarelli | |
| 5,226,696 A * | 7/1993 | Klages et al. | ............ 296/203.01 |
| 5,634,663 A * | 6/1997 | Krupp et al. | ................... 280/800 |
| 5,716,155 A * | 2/1998 | Yoshida et al. | ................ 403/187 |
| 6,123,378 A * | 9/2000 | Teply et al. | ...................... 296/29 |
| 7,488,022 B2 | 2/2009 | Belwafa et al. | |
| 8,262,155 B2 * | 9/2012 | Leanza | .......... 296/205 |
| 8,915,530 B2 * | 12/2014 | Wagner et al. | ................. 296/29 |
| 2003/0152745 A1 | 8/2003 | Wagenblast | |
| 2005/0064135 A1 | 3/2005 | Perrin | |
| 2010/0244497 A1* | 9/2010 | Honda et al. | .................. 296/205 |
| 2010/0327631 A1* | 12/2010 | Brunner | ........................ 296/205 |

FOREIGN PATENT DOCUMENTS

| | | |
|---|---|---|
| DE | 4119639 A1 | 10/1992 |
| DE | 19538803 A1 | 4/1996 |
| DE | 10329017 A1 | 1/2005 |
| DE | 202005009101 U1 | 2/2006 |
| DE | 102005031730 A1 | 4/2007 |
| DE | 102010021946 A1 | 12/2011 |
| FR | 2969249 A1 | 6/2012 |
| JP | H0731889 Y2 | 7/1995 |
| WO | 03045759 A1 | 6/2003 |

\* cited by examiner

*Primary Examiner* — Jason S Morrow
(74) *Attorney, Agent, or Firm* — Ingrassia Fisher & Lorenz PC

(57) ABSTRACT

An understructure for a motor vehicle includes two side members and multiple cross members fastened to the side members in each case via adapters. The adapters each include two identical shells which are each connected at the face end to a cross member and side member and to one another alongside.

9 Claims, 3 Drawing Sheets

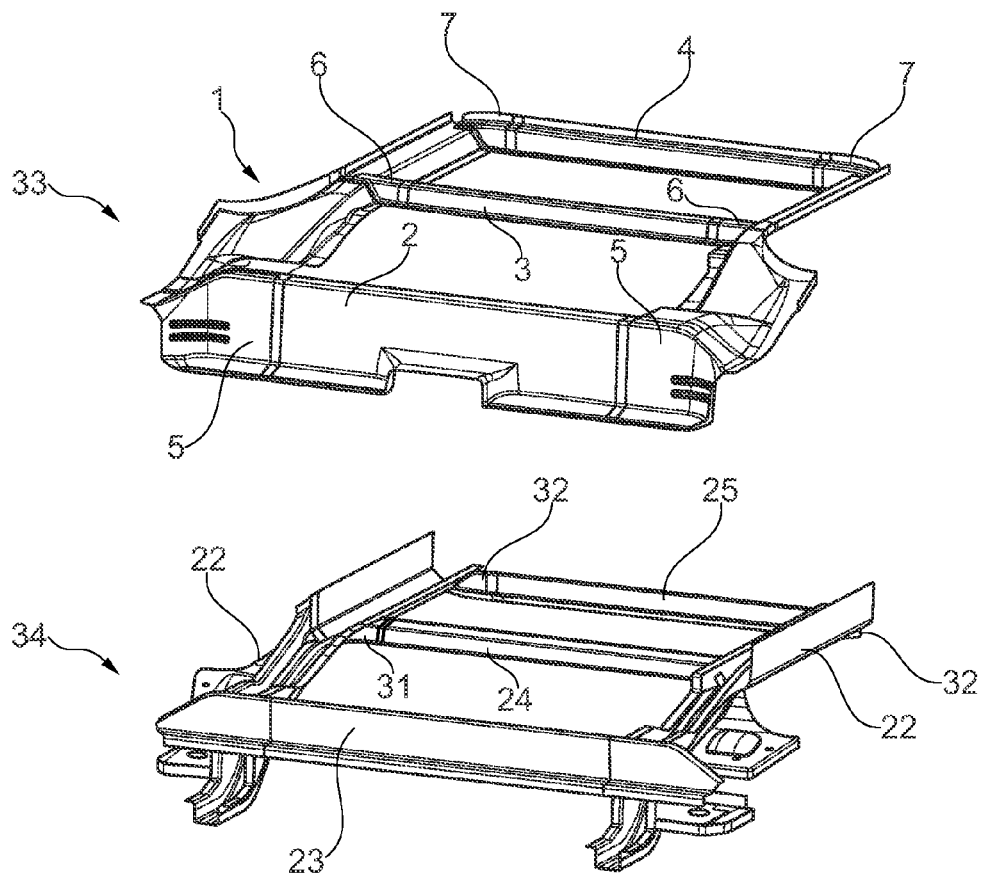
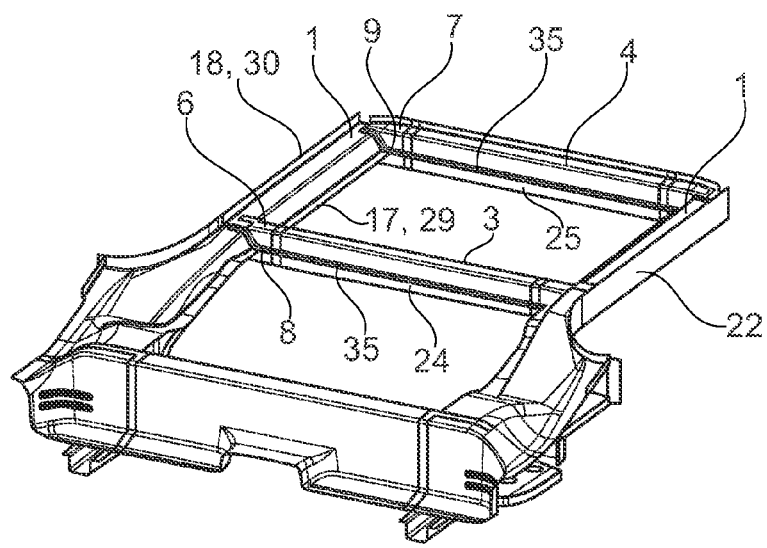

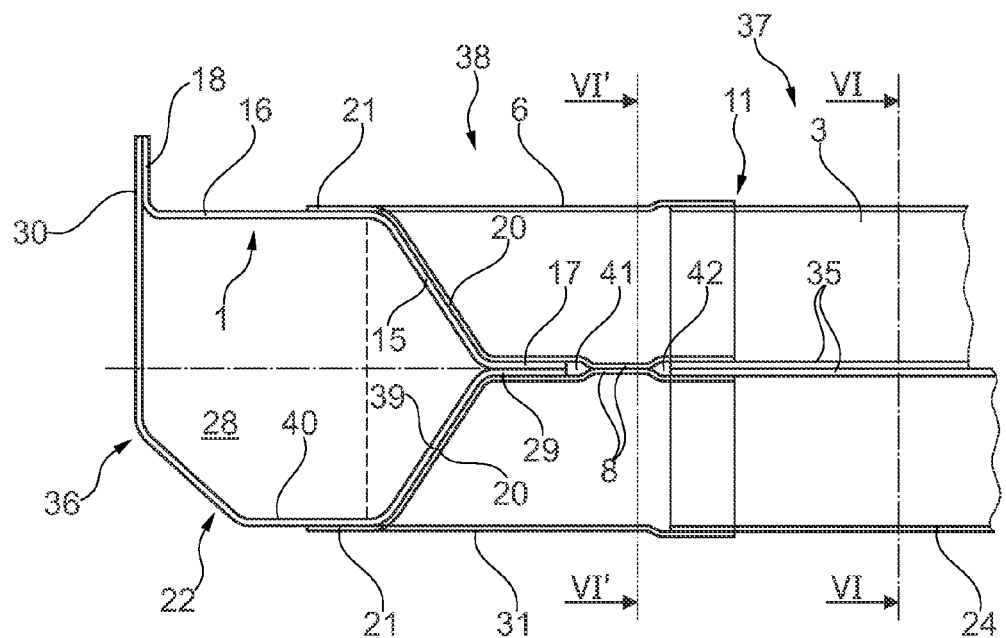
Fig. 5
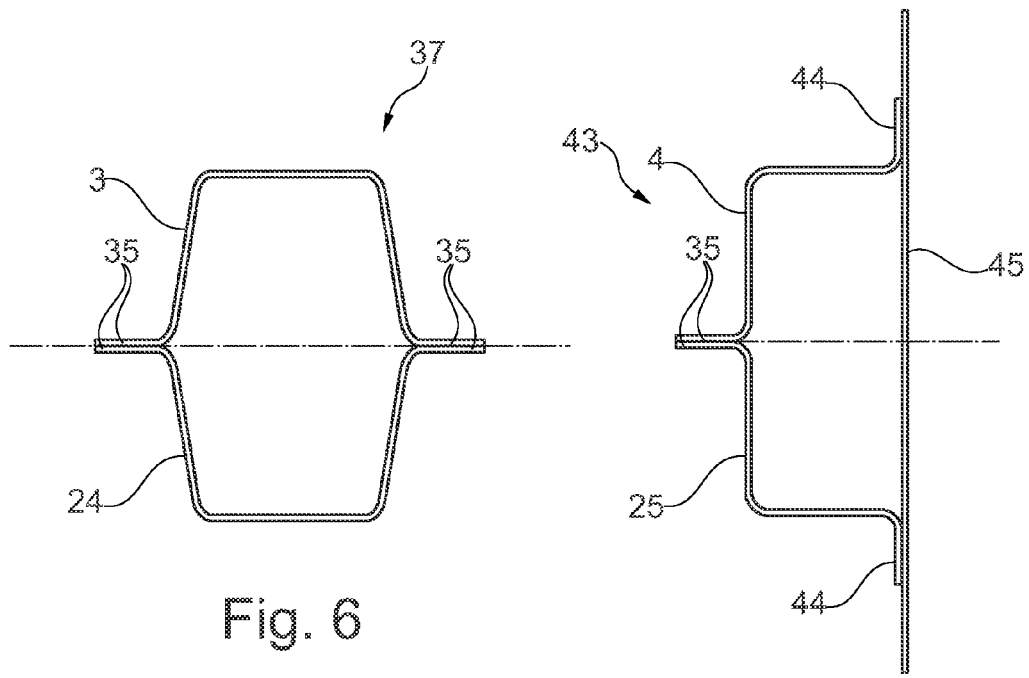
Fig. 6
Fig. 7

UNDERSTRUCTURE FOR A MOTOR VEHICLE

CROSS REFERENCE TO RELATED APPLICATION

This application claims priority to German Patent Application No. 102013016456.7 filed Oct. 2, 2013, which is incorporated herein by reference in its entirety.

TECHNICAL FIELD

The technical field relates to a body structure for a motor vehicle, and more particularly to an understructure having a ladder structure.

BACKGROUND

Ladder frames as support for the paneling of a motor vehicle body have been known for more than a hundred years. Modern self-supporting passenger car bodies frequently include an understructure with side members and cross members which, even if these merely have to absorb a part of the static forces that occur on a motor vehicle, can be considered a ladder frame.

Such an understructure is known from U.S. Pat. No. 6,540,286 B2. The understructure includes two side members, which extend over the entire length of the vehicle and are interconnected by multiple cross members of a cross section that is constant over their length. In that these cross members are cut to size from a prefabricated cylindrical tube in the respective length required, bodies can be produced in different width. Some of these cross members abut lateral flanks of the side members located opposite one another, while others laterally protrude over the side member and are therefore fastened supported by these side members. The small size of the contact area between the side members and cross members contacting or crossing one another exacerbates the production of a connection that can be subjected to torsional load.

In the case of the cross member abutting the side members, the cross members have to maintain a predetermined length with high precision in order to ensure that all cross members can be welded together with an adequately uniform gap width between them and the side members. The production of the cross members in an exactly predetermined length is rendered substantially more difficult when the area of the side member, to which the cross members have to be welded, is not flat. This restriction in turn is disadvantageous for the load capacity of the weld.

There is therefore a need for a motor vehicle understructure that can be produced efficiently and with a small number of different parts yet achieves a high load capacity with low weight.

SUMMARY

According to a configuration of the present disclosure, this need is satisfied by an understructure for a motor vehicle having two side members and multiple cross members each fastened to the side members via adapters. The adapters each include two identical shells which are each connected to a cross member and side member and to one another alongside. The shells can also adapt on their face end assigned to the side member to complex contours of the side member. At the same time, they enable offsetting any fluctuating lengths of the cross members in a simple manner.

The side members can each be assembled from two profiles which are connected to one another via flanges on the edge side. By being mirror-inverted relative to one another, the wall regions of the two profiles adjoining the flanges on the edge side make possible the joining of the shells of the adapter which are identical to one another. In particular in each case of one of the shells to one of the profiles and of the other shell to the other profile. Each of the wall regions includes a first wall, which adjoins the flange at an obtuse angle. A second wall adjoins the first wall parallel to the flange.

A fastening flange of the shell engages with one or both of these walls. In particular, a connection between the side members and the cross members is formed when the flanges of the shells engage at least with the second walls which are substantially parallel to one another that can be subjected to high tensile load and torsionally strong connection be created. In order to accommodate the projecting flanges of a side member, the adapters can each have a slot delimited by one of their two shells on a face end facing the side member.

Production tolerances in the length of the cross members can be offset in particular in that the adapters and the cross members are joined in the manner of a plug connection and the insertion depth of the cross member in the adapter or of the adapter in the cross member can vary depending on the length of the latter.

The cross members can also be produced cost-effectively in that they each include interconnected profiles of the same cross section. These can each be cut to the length required according to the desired body width in particular from a same strand of continuous material.

In order to simplify the assembly of the understructure, each shell of the adapter can be connected to exactly one of the profiles. This allows in particular to separately from one another prefabricate and subsequently interconnect two ladder-like parts of the understructure, one, each including an upper profile of the side member and cross member and upper shells of the adapter, and one, each including lower profiles and lower shells.

The two profiles of the cross members of identical cross section can mutually complement one another into a hollow profile. They can also form a hollow profile together with a back wall of the body.

BRIEF DESCRIPTION OF THE DRAWINGS

The present disclosure will hereinafter be described in conjunction with the following drawing figures, wherein like numerals denote like elements.

FIG. 3 shows an upper and lower part prior to joining;

FIG. 4 shows the finish-joined understructure;

FIG. 5 shows a section in vehicle transverse direction through a side member of the understructure;

FIG. 6 shows a section in vehicle longitudinal direction through a cross member of the understructure; and FIG. 7 shows a section through a second cross member.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
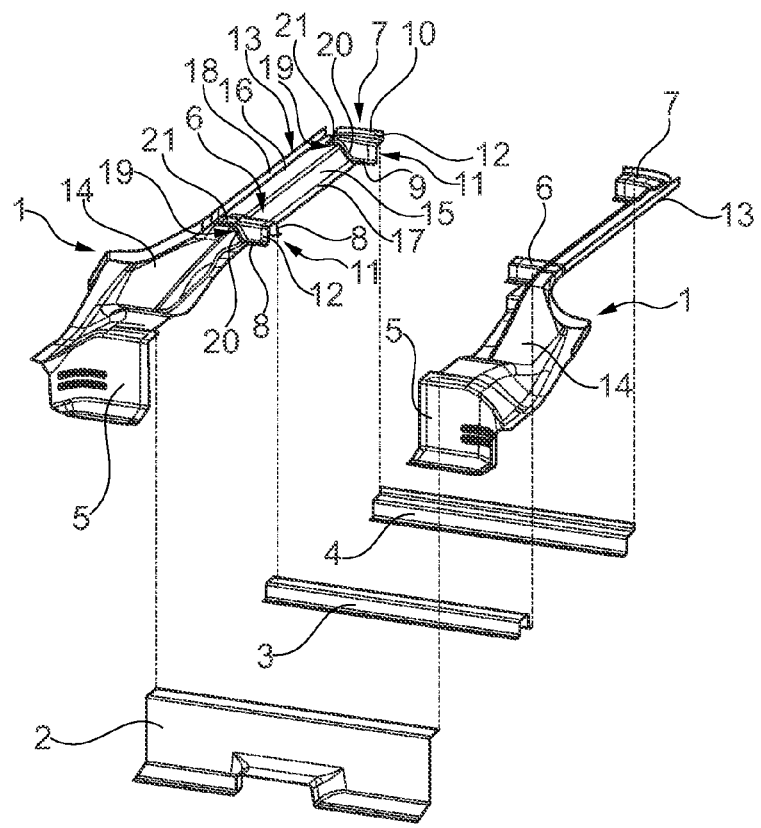
FIG. 1 shows an upper part of the body understructure according to the present disclosure in a partly expanded representation.

In a partly expanded view, FIG. 1 shows structural elements which are provided for being joined into an upper ladder-like component of an understructure according to the present disclosure. On the finished vehicle the understructure will extend below a rear seat row and from a load compartment as far as to the tail of the vehicle. The structural elements shown in FIG. 1 include upper profiles 1 of a right and left side member, a heel plate 2, an upper profile 3 of a middle cross member and an upper profile 4 of a rear cross member. Upper adapter shells 5, 6, 7 for connecting heel plate 2 and cross member profiles 3, 4 to the side member profiles 1 are formed separately from the profiles 1, but are shown in FIG. 1 in the state already assembled on the profiles 1.

The adapter shells 6, 7, each in a middle region, have the same cross section as the profiles 3, 4, with which they are to be connected, i.e. a hat-shaped cross section with flanges 8 forming the brim of the hat. In the case of the adapter shell 6 belonging to the middle cross member and an L-shaped cross section with flanges 9, 10 extending from the ends of the L horizontally and in the case of the adapter shell 7 of the rear cross member. On a face end 11 of the shell 6 and 7 respectively facing the cross member profile 3 and 4 respectively, the cross section is slightly expanded in each case in order to form a flange 12 that is provided in order to be placed and welded in the area contacting an end of the profile 3 and 4 respectively.

The upper side member profile 1 can be deep-drawn in one piece, but a rear section 13 and a front section 14 can also be prefabricated separately and then joined. Since the rear section 13 has a cross section that remains the same over its entire length it is well suited for the production through roll-forming. Since the section 13 can be cut off in different lengths as required from a roll-formed profile, the multi-part construction of the upper side member profile 1 also facilitates the production of bodies in different lengths from largely identical structural elements.

The adapter shells 6, 7 are attached at the rear section 13 of the side member profile 1. Similar to the cross member profile 4, this section 13 has an L-like cross section with a sloping wall 15 facing the vehicle interior and a horizontal wall 16 bordering thereon towards the outside. The lower edge of the sloping wall 15 facing the vehicle middle is adjoined by an elongated horizontal flange 17, while a vertical flange 18 extends upwards from the edge of the horizontal wall 16 facing the vehicle outside. The horizontal flange 17 runs in a same plane with the flanges 8 of the middle sections of the adapter shells 6, 7.

On a face end 19 of the adapter shells 6, 7 facing the side member profile 1, the flanges 8, 9 of the adapter shells 6, 7 initially merge into flanges 20 which are welded contacting the sloping walls 15 and finally into a flange 21 which is supported on the horizontal wall 16 and welded there.

Figure 2:
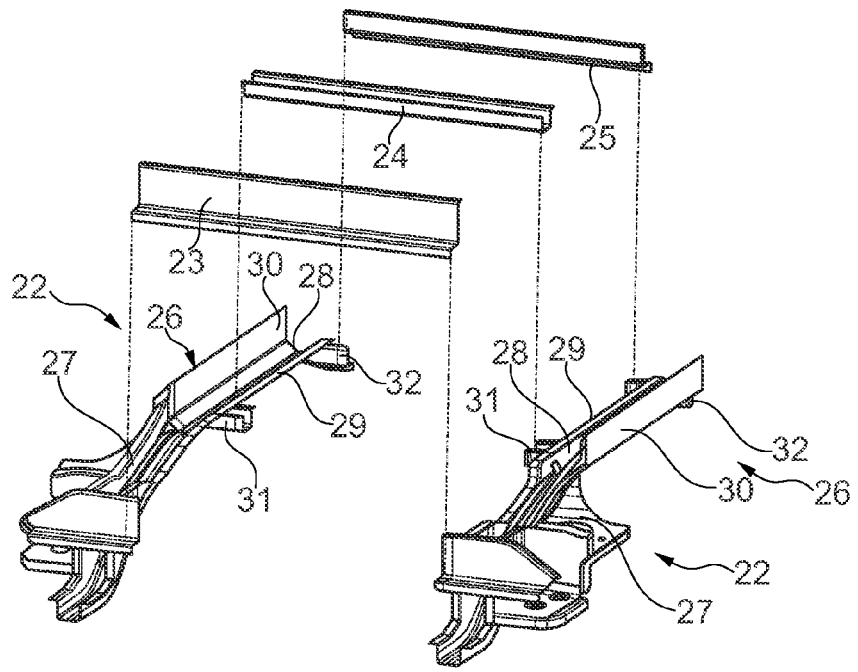
FIG. 2 shows a lower part of the body understructure in a partly expanded representation.

FIG. 2 shows a view, analogous to FIG. 1, of lower profiles 22 of the side members, a heel plate reinforcement 23 and of lower profiles 24, 25 of the middle and of the rear cross member. The lower side member profile 22, like the upper one, can be joined from multiple individual parts. In particular, a rear section 26 with a cross section of the lower side member profile 22 that remains the same in longitudinal direction can be produced as a roll-formed part and welded to deep-drawn individual parts forming a front section 27 of the profile 22. The rear section 26 substantially has the shape of the letter J in cross section, with a central channel 28, a flange 29 horizontally projecting from a wall of the channel 28 facing the vehicle middle and a vertical leg 30 on the vehicle outside.

The lower cross member profiles 24, 25 each have the same cross section as their upper counterpart 3 and 4 respectively and are cut from the same roll-formed endless material in the length that is required in each case for realizing a vehicle body in the desired width. The lower adapter shells 31, 32 already shown welded to the lower side member profiles 22 are also identical in shape to their upper counterparts 6 and 7 respectively.

FIG. 3 shows the upper profiles 1-4 and adapter shells 5-7 finish assembled into an upper ladder-like component 33 and the lower profiles 22-25 and adapter shells 31, 32 assembled into a lower ladder-like component 34.

In the next assembly step, as shown in FIG. 4, the upper component 33 is placed into the lower one 34, wherein the flanges 17, 29 and the flange 18 and an upper edge of the vertical leg 30 of the side member profiles 1, 22 come to lie against one another and are welded together. The flanges 8, 9 of upper and lower adapter shells 6, 31 and 7, 32 respectively mutually contacting one another and flanges 35 of the cross member profiles 3, 4, 24, 25 contacting one another are welded together in exactly the same way.

FIG. 5 shows the resulting cross section through a side member 36 formed by the profiles 1, 22, an end of a middle cross member 37 formed by the profiles 3, 24 and an adapter 38 formed by the adapter shells 6, 31, which connects the side members and cross members 36, 37 to one another. The adapter shells 6, 31 are identical and with respect to a plane running through their flanges 8 contacting one another are arranged mirror-inverted relative to one another. In order to make possible welding of the lower profile 22 to the adapter shell 31 also over a large area, the channel 28 of the profile 22, starting out from the flange 29, initially includes a wall 39 obliquely extending to the outside and downwards which is mirror-inverted with respect to the wall 15 of the profile 1 and, adjoining thereon, a horizontal wall 40, which the flanges 20, 21 of the lower adapter shell 31 abut over a large area. Between the sloping flanges 20 and the flanges 8 fastened to one another the adapter 38 includes a slot 41, in which the flanges 17, 29 of the side member 36 which are connected to one another, engage. A corresponding slot 42 on the opposite face end 11 receives the ends of the flanges 35 of the cross member 37 which are connected to one another. The flanges 35 are not fully inserted into the slot 42. By varying the insertion depth the production tolerances during the cutting to size of the profiles 3, 24 of the cross member 37 can be offset and the spacing between the side members 36 located opposite one another on both sides of the body be adjusted exactly.

FIG. 6 shows a cross section of the middle cross member 37 along the line VI-VI of FIG. 5. The profiles 3, 24 are identical and, by being welded together along their flanges 35, form a hollow profile. A cross section through the adapter 38 at the height of the flanges 8 contacting one another corresponding to the plane VI'-VI' from FIG. 5 would show the same cross-sectional shape.

FIG. 7 shows a section analogous to FIG. 6 through a rear cross member 43 formed by one of the profiles 4, 25. The profiles 4, 25 which are identical in cross section are connected to one another at horizontal flanges 35 and via vertical flanges 44 to a body back wall 45 into a closed cross section.

The design described above makes possible realizing numerous body types with a very small number of different parts. In the case of the cross member 37, 43, in each case independently of their length, only a single type of roll-formed profile is required in order to produce the upper and lower profiles. Accordingly, the length of the body in its rear region can also be varied in that the rear sections 13, 26 are each cut to size in different lengths. For realizing the adapters 38 for the middle and the rear cross member 37, 43 respectively, only a single small-size deep-drawn part each is required.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An understructure for a motor vehicle comprising
two side members, wherein each side member includes two profiles having flanges and a wall region adjoining the flanges, the two profiles connected to one another via the flanges on an edge side;
a plurality of cross members; and
a plurality of adaptors, an adaptor fastening an end of a cross member to a side member, wherein each adapter comprises two identical shells connected at a face end to the cross member and the side member and to one another alongside, each shell having at least one fastening flange which engages with a wall of the wall region, wherein the adapters on a face end facing the side member have a slot formed therein bounded by the two shells which receive the flanges on the edge side.

2. The understructure according to claim 1, wherein the wall regions on the edge side are mirror-inverted relative to one another.

3. The understructure according to claim 2, wherein each wall region comprises a first wall which adjoins the flange at an obtuse angle.

4. The understructure according to claim 3, wherein each wall region comprises a second wall which adjoins the first wall parallel to the flange.

5. The understructure according to claim 1, wherein the adapters and the cross members are joined to form a plug connection.

6. The understructure according to claim 1, wherein each cross member comprises two profiles which are identical in cross section and each connected to one another.

7. The understructure according to claim 6, wherein each shell of the adapter is connected to exactly one of the profiles.

8. The understructure according to claim 6, wherein the two profiles of identical cross section are connected to one another into a hollow profile on at least one of the cross members.

9. The understructure according to claim 6, wherein the two profiles are connected with a back wall into a hollow profile on at least one of the cross members.

* * * * *